United States Patent
Liu et al.

(10) Patent No.: US 6,765,172 B1
(45) Date of Patent: Jul. 20, 2004

(54) LASER FUSION BASED WDM COUPLER

(75) Inventors: Xu Liu, Fremont, CA (US); Tracy Brewer, Hayward, CA (US); Frank Liang, Cupertino, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 10/308,306

(22) Filed: Dec. 2, 2002
(Under 37 CFR 1.47)

(51) Int. Cl.[7] .............................................. B23K 26/20
(52) U.S. Cl. ............................ 219/121.63; 219/121.64; 219/121.83
(58) Field of Search .................... 219/121.6, 121.63, 219/121.64, 121.65, 121.66, 121.83, 121.85

(56) References Cited

U.S. PATENT DOCUMENTS

| | | | | |
|---|---|---|---|---|
| 4,810,052 A | * | 3/1989 | Fling | 385/44 |
| 5,987,201 A | * | 11/1999 | Chen | 385/43 |
| 6,490,931 B1 | * | 12/2002 | Fernald et al. | 73/705 |
| 6,676,307 B1 | * | 1/2004 | Yang et al. | 385/96 |

OTHER PUBLICATIONS

Timmothy E. Dimmic, George Kakarantzas, Timothy A. Birks and Philip St. J. Russell, Carbon Dioxide Laser Fabrication Of Fused–Fiber Couplers and Tapers, Applied Optics, vol. 38, No. 33, pp. 6845–6848 (Nov. 20, 1999).

* cited by examiner

Primary Examiner—Samuel M. Heinrich
(74) Attorney, Agent, or Firm—Blakely, Sokoloff, Taylor & Zafman LLP (57) ABSTRACT

A method is described that involves scanning a laser beam across and applying a stretching force to a fusion region that is formed by a neighboring pair of optical fibers that include a core and a cladding layer. The scanning and applying occurs while the optical permissiveness of an optical path that flows through the fusion region is monitored.

25 Claims, 10 Drawing Sheets

FIG. 10

LASER FUSION BASED WDM COUPLER

FIELD OF INVENTION

The field of invention relates to optical component technology generally; and, more specifically, to a laser fusion based WDM coupler.

BACKGROUND

WDM Couplers

Figure 1:
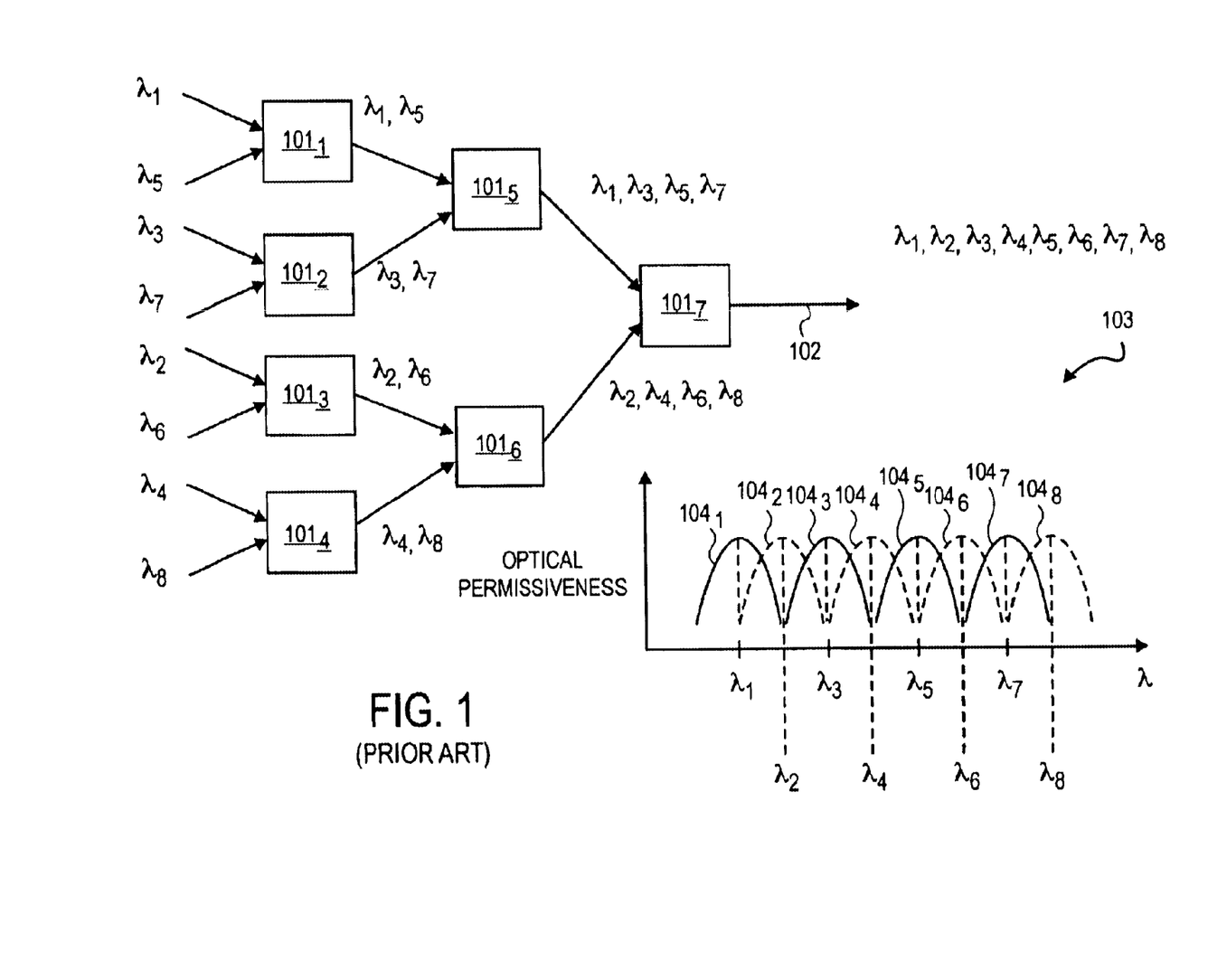
FIG. 1 shows an embodiment of an 8×1 WDM coupler module.

A Wavelength Division Multiplexed (WDM) coupler module is a device that, through an arrangement of discrete WDM couplers, merges N optical channels onto a single optical fiber. FIG. 1 shows an embodiment of an 8×1 WDM coupler module that is constructed with an arrangement of seven 2×1 WDM couplers $101_1$ through $101_7$. The 8×1 WDM coupler module of FIG. 1 is responsible for integrating 8 optical channels onto a single optical fiber. An optical channel corresponds to the optical permissiveness of a fiber optic path, as a function of wavelength, within an optical wavelength range that is referenced around a "peak" wavelength.

Optical permissiveness is figure of merit as to the tendency of a fiber optic path to allow light to propagate forward. Thus, if the optical permissiveness of a fiber optic path is "high", the fiber optic path tends to allow light to propagate forward; and, if the optical permissiveness of a fiber optic path is "low", the fiber optic path tends to "block" light from propagating forward. Those of ordinary skill typically measure optical permissiveness for an optical device (such as a WDM coupler module) by measuring the intensity of light received at an output as a function of wavelength. The curve that is "traced out" is often referred to as the "spectrum" of the optical path being measured (and which is being referred to herein as optical permissiveness).

Typically, the optical permissiveness of an optical channel within a WDM coupler module "rolls off" as the wavelength deviates from its associated peak wavelength. As such, it may be said that the shape of an optical channel rolls off as optical wavelength deviates from its peak wavelength. FIG. 1 demonstrates an example by way of a depiction 103 of the optical permissiveness of the 8×1 WDM coupler module (as observed from its output 102). Note that eight unique optical channels are observed $104_1$ through $104_8$. Each of the optical channels $104_1$ through $104_8$ has its own corresponding peak wavelength $\lambda_1$ through $\lambda_8$, respectively. Note that, from their shape, each of the optical channels $104_1$ through $104_8$ tend to pass light having its corresponding peak wavelength and tend to increasingly reject or block light that deviates from its peak wavelength.

As can be seen from FIG. 1, the 8×1 WDM coupler module is formed with seven 2×1 WDM couplers $101_1$ through $101_7$. Here, each 2×1 coupler integrates onto its output fiber the light intensity that is received from its pair of input fibers. For example, 2×1 coupler $101_1$ is generally designed to receive light intensity (at a first fiber optic input) that peaks at wavelength $\lambda_1$ and receive light intensity (at a second input) that peaks at wavelength $\lambda_5$. The 2×1 WDM coupler $101_1$ integrates the received light intensity onto its output optical fiber (which also acts as a first input to 2×1 coupler $101_5$). As such, the notation "$\lambda_1,\lambda_5$" is used proximate to the output of 2×1 coupler $101_1$.

By nature of the specific combinations of input wavelength observed in the 8×1 WDM coupler module of FIG. 1, note that each successive 2×1 coupler (passing forward through the coupler module) may be designed with decreased spacing between neighboring optical channels. For example, the 8×1 WDM coupler module of FIG. 1 may be designed such that: 1) 2×1 WDM couplers $101_1$ through $101_4$ each have a neighboring channel peak wavelength spacing of $4(\lambda_8-\lambda_1)/7$; 2) 2×1 WDM couplers $101_5$ and $101_6$ each have a neighboring channel peak wavelength spacing of $2(\lambda_8-\lambda_1)/7$; and 3) 2×1 WDM coupler $101_7$ has a neighboring channel center wavelength spacing of $(\lambda_8-\lambda_1)/7$.

Fabrication of WDM Couplers

Figure 2A:
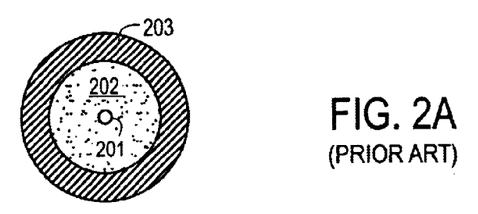
FIG. 2a shows a cross section of a optical fiber.
Figure 2B:
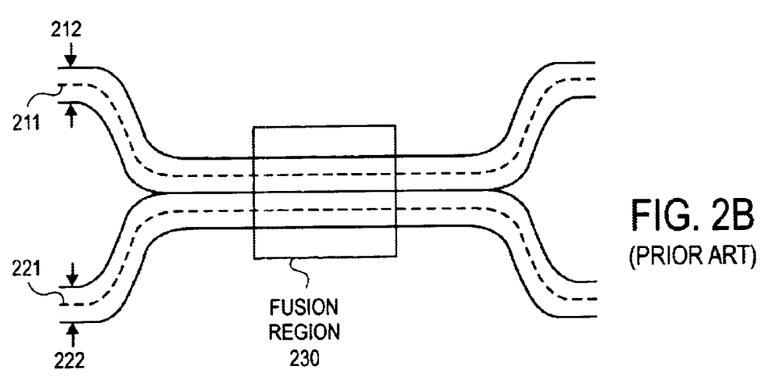
FIG. 2b shows a neighboring pair of optical fibers prior to their being fused within a fusion region.
Figure 2C:
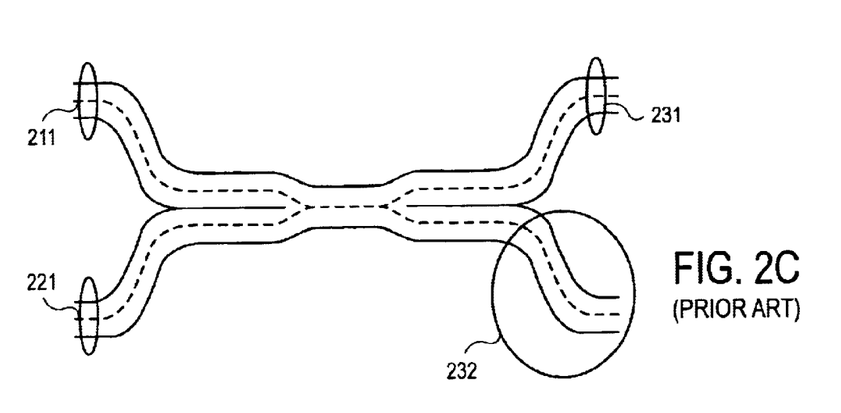
FIG. 2c shows the neighboring pair of optical fibers after they have been fused together.

FIGS. 2a through 2c relate to the construction of a 2×1 coupler. FIG. 2a shows a cross section of a typical optical fiber. The optical fiber cross section of FIG. 2a shows a central core 201 surrounded by a cladding layer 202. A protective jacket 203 surrounds the cladding layer 202. A common embodiment further includes a core 201 diameter of 5–9 µm and a cladding layer 202 diameter of 125 µm. FIG. 2b shows an initial manufacturing "setup" just prior to manufacture of a 2×1 WDM coupler. According to the depiction of FIG. 2b a pair of optical fibers which have been stripped of their corresponding jackets are fixedly positioned next to one another. Here, FIG. 2b shows the cladding layer 212 and central core 211 of a first optical fiber; and, the cladding layer 222 and central core 221 of a second optical fiber.

Within a fusion region 230, the pair of stripped optical fibers neighbor one another. Heat is then applied within the fusion region 230 through the use of an open flame. As a consequence of the extreme heat that is applied to the fusion region 230, the pair of optical fibers begin to fuse together. FIG. 2b shows a depiction of the pair of optical fibers after they have been fused together (e.g., after the open flame has been removed). Because of the merging of the fibers, a 2×1 coupler can be readily formed. For example, optical fiber end 231 can be viewed as the output of the 2×1 coupler, optical fiber end 211 can be viewed as a first input to the 2×1 coupler, and optical fiber end 221 can be viewed as a second input to the 2×1 coupler. Section 232 can be terminated as a "no function" port.

Note that the cores from the pair of optical fibers are merged in the depiction of FIG. 2c. Typically, couplers requiring a narrow neighboring channel spacing (e.g., such as coupler $101_7$ of FIG. 7) may need to have merger of the cores within the fusion region in order to obtain the narrow channel spacing. Couplers having a more relaxed neighboring channel design (e.g., such as couplers $101_1$ through $101_4$ of FIG. 7) may be able to allow some degree of separation of the fiber optic cores.

Problems with WDM Coupler Fabrication

Figure 3A:
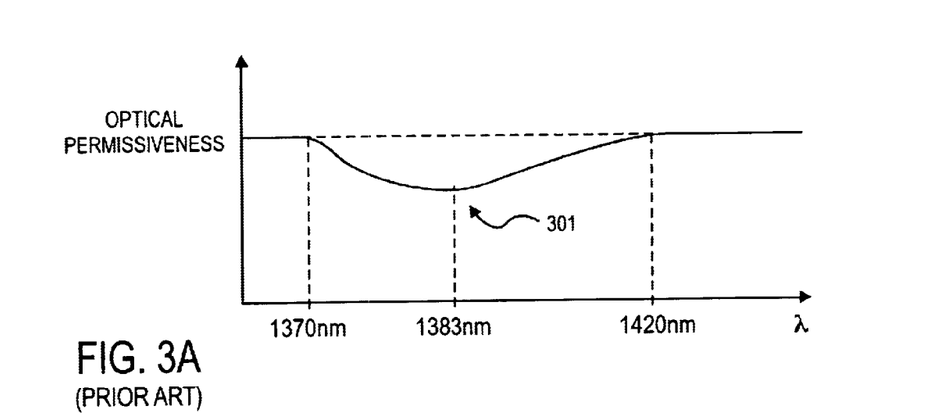
FIG. 3a shows optical permissiveness vs. wavelength for a taper of optical fiber that has been affected with water absorption.
Figure 3B:
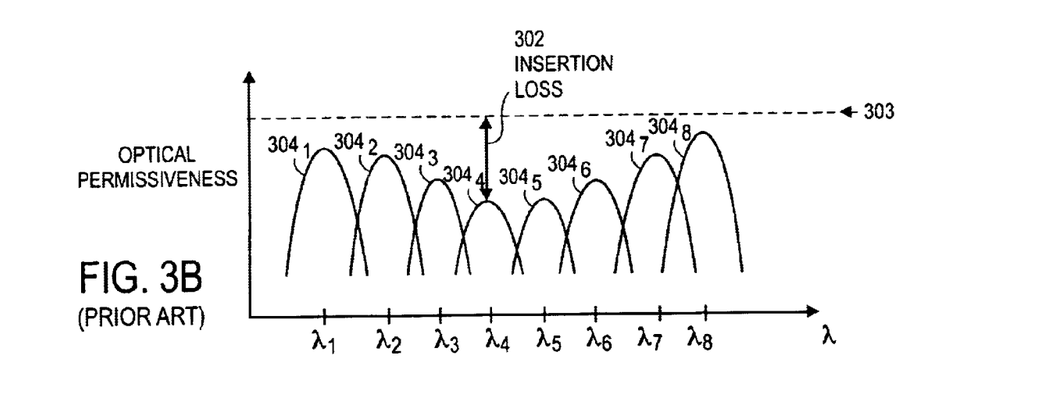
FIG. 3b shows optical permissiveness for a 8×1 WDM coupler module that has been formed with components that suffer from water absorption.

FIGS. 3a and 3b relate to a traditional problem involved in the manufacture of WDM couplers. FIG. 3a shows optical permissiveness as a function of wavelength for a typical taper of optical fiber made by a flame fusion process. For any type of optical fiber made by flame fusion, a defect (that is related to the water absorption introduced by a traditional flame fusion process) causes a noticeable and undesirable "bump" 301 in the optical permissiveness of the optical fiber taper (approximately over a wavelength range of 1370 nm to 1420 nm.

The bump 301 has two drawbacks. Firstly, the drop corresponds to increased "insertion loss" of optical devices (such as WDM couplers and coupler modules) that process light having wavelengths in the realm of the bump 301; and, secondly, such insertion loss varies in the realm of the bump 301. As increased insertion loss corresponds to more optical rejection—increased insertion loss by itself may threaten the practical use of an optical device (because most optical networks attempt to minimize the insertion loss caused by its various components). Moreover, many optical devices are designed to have substantially even (or "flat") optical permissiveness over the range of used optical wavelengths (each peak wavelength for the optical channels of a WDM coupler module). The bump 301 corresponds to a deviation from this desired property.

FIG. 3b illustrates the combined effect of both drawbacks for a WDM coupler module. FIG. 3b (which may be compared with the optical permissiveness 103 of FIG. 1) corresponds to the optical permissiveness of an 8×1 coupler that is made from 2×1 couplers having fiber optic properties that suffer from water absorption. Assuming that the 8×1 coupler is designed to operate over the wavelength range that is impacted by the water absorption "bump" of FIG. 3b (e.g., $\lambda_1$=1380 nm; $\lambda_2$=1385 nm; $\lambda_3$=1390 nm; $\lambda_4$=1395 nm; $\lambda_5$=1400 nm; $\lambda_6$=1405 nm; $\lambda_7$=1410 nm; $\lambda_8$=1415 nm), each of the optical channels $304_1$ through $304_7$ suffer additional loss in permissiveness and suffer different degrees of loss in permissiveness because of water absorption.

As a consequence, varying peak wavelength permissiveness is observed across the range of optical channels $304_1$ through $304_7$—some of which may be sufficiently severe (e.g., the insertion loss 302 for optical channel $304_4$) so as to cause an optical channel to fail to meet a minimum required permissiveness. Moreover, it is important to note that even though optical fibers that are "free" of water absorption problems are available—their use does not remove the water absorption problem with respect to the manufacture of WDM couplers. Better said, even if one uses water absorption "free" optical fibers during the manufacture of a WDM coupler, water absorption related "problems" still arise. Here, the open flame fusion process is believed to re-introduce the fibers to a water absorption susceptibility state. As a consequence, use of optical fibers that are initially free of water absorption does not significantly remove the ill-effects of water absorption with respect to manufactured WDM couplers.

FIGURES

The present invention is illustrated byway of example and not limitation in the figures of the accompanying drawings, in which like references indicate similar elements and in which.

DETAILED DESCRIPTION

Figure 4:
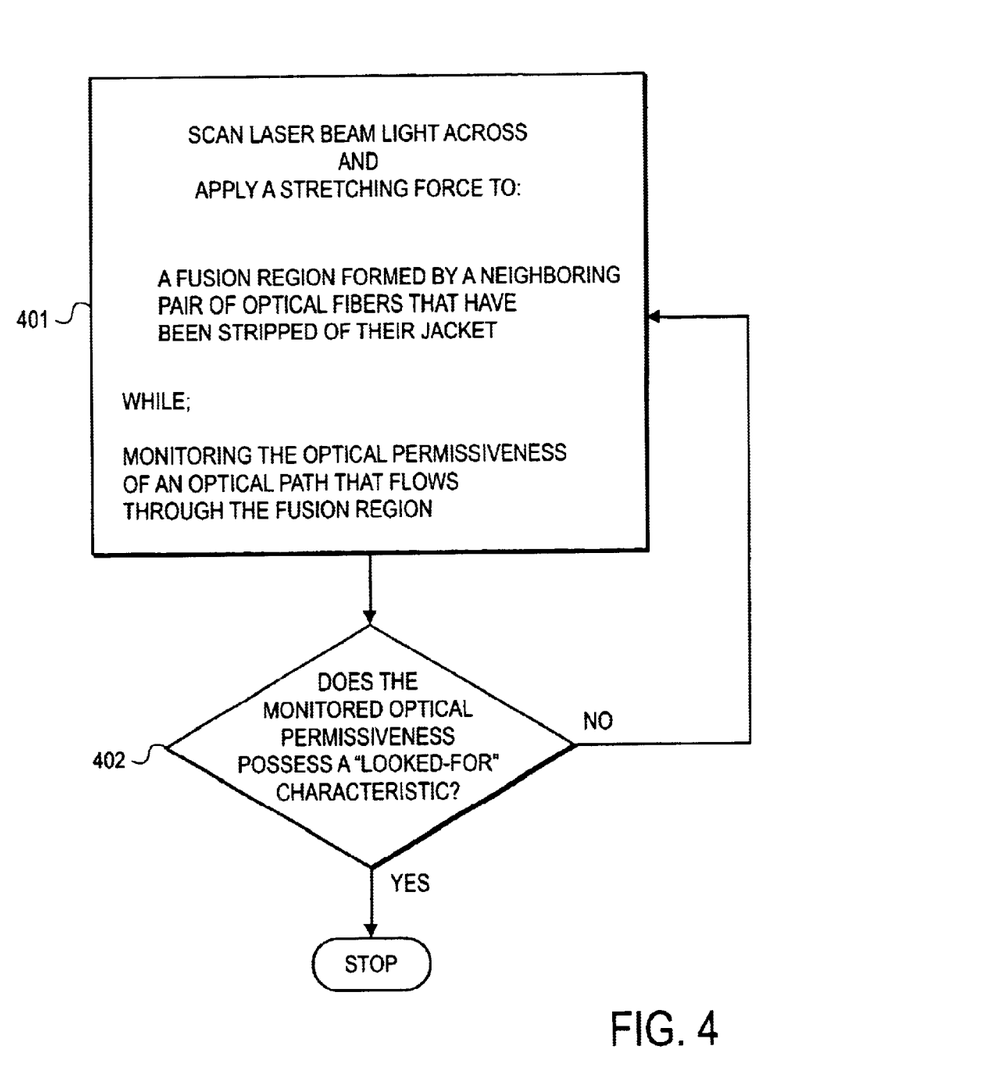
FIG. 4 shows a method of manufacture for a WDM coupler that should exhibit significantly reduced water absorption characteristics.

FIG. 4 shows an embodiment of a methodology that can be used to manufacture a WDM coupler so as to be substantially immune to the water absorption problem that was described in the Background section. According to the methodology observed in FIG. 4, rather than applying an open flame to the fusion region; instead, laser beam light is scanned across the fusion region. More specifically, laser beam light is scanned across and a stretching force is applied to a fusion region that is formed by a neighboring pair of optical fibers that have been stripped of their jacket; while, the optical permissiveness of an optical path that flows through the fusion region is monitored 401. The laser beam light is continually scanned and the fusion region is continually stretched until a "looked for" optical permissiveness (e.g., a particular profile or resulting characteristics that naturally follow as consequence of a particular profile) is observed 402.

Figure 5A:
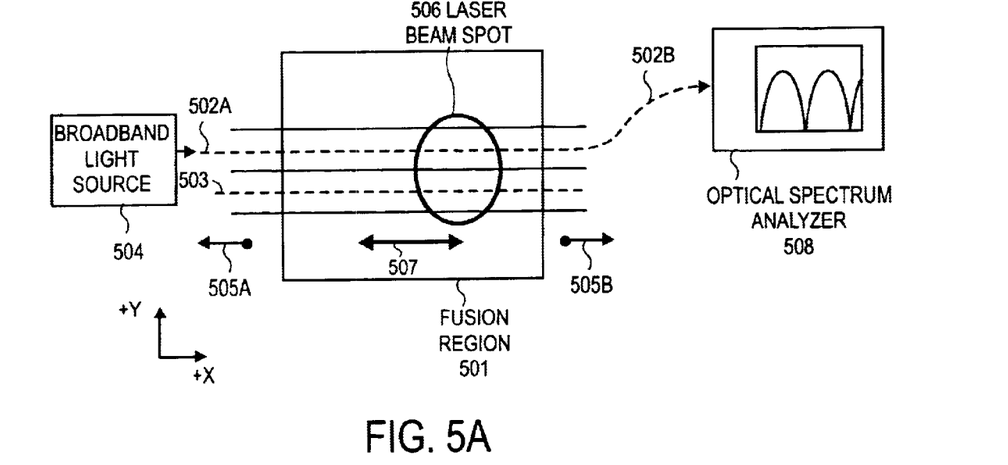
FIG. 5a shows a depiction of neighboring pair of optical fibers that may be formed into a WDM coupler through execution of the process observed in FIG. 4.
Figure 5B:
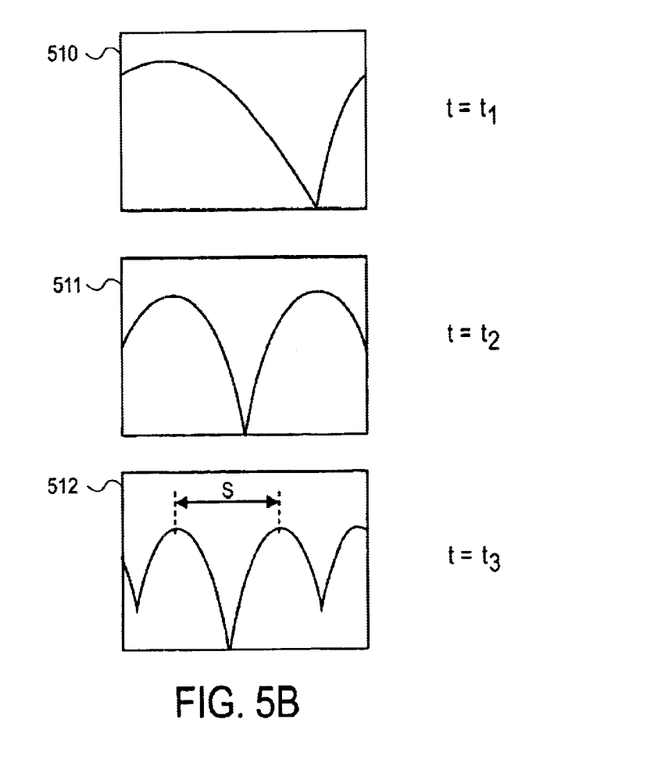
FIG. 5b shows an optical spectrum analyzer display at three differing moments of time during the manufacture of a WDM coupler according to the process observed in FIG. 4.

FIGS. 5a and 5b help illustrate an example. FIG. 5a illustrates a depiction of a fusion region 501 and assorted equipment 504, 508. FIG. 5b illustrates an exemplary depiction of a plurality of optical permissiveness curves that are taken at different times during the fusion process 401. Better said, FIG. 5b corresponds to a plurality of different items that are monitored according to the process 401 of FIG. 4. Referring to FIG. 5a, note that a laser beam spot 506 is drawn superimposed over a pair of neighboring optical fibers that have been stripped of their jacket. The laser beam spot 506 swings back and forth (i.e., "is,scanned") over the pair of optical fibers in order to increase their temperature. Temporal vector 507 is an attempt to illustrate the "back and forth" motion of the laser beam spot 506 over the pair of optical fibers.

Force vectors 505a and 505b are an attempt to illustrate that while the laser beam spot 506 is being scanned across the pair of optical fibers the pair of fibers are also stretched. That is, force vector 505a corresponds to a force that is directed in first direction and force vector 505b corresponds to a force that is directed in an opposite direction to that of force vector 505*a*. A broadband light source 504 is used to direct light into one 502*a* of the WDM coupler input optical fibers. By directing broadband light into one 502*a* of the WDM coupler input optical fibers, and by monitoring the intensity of the light that appears at the WDM coupler output 502*b* with an optical spectrum analyzer 508, the optical permissiveness of the fusion region that is being formed can be monitored while it is being formed.

The broadband light source 504 emits light across the various wavelengths of interest at a sufficient of density (e.g., so that the relevant optical permissiveness curves can be observed). Wavelengths of light that are passed more easily by the fusion region (so as to correspond to higher optical permissiveness) are received at the optical spectrum analyzer 508 with stronger intensity than wavelengths of light that are passed less easily by the fusion region (so as to correspond to lower optical permissiveness). As a consequence, the optical spectrum analyzer 508 is able to naturally trace out the relevant optical permissiveness information of the fusion region; and, changes to the optical permissiveness of the fusion region that occur while the fusion region is being heated and stretched can be dynamically observed.

FIGS. 5*a* through 5*c* illustrate an exemplary depiction of three different optical permissiveness curves that are observed at three different times while a fusion region is being stretched and heated with a scanning laser beam. The first depiction 510 at time t=t1 precedes the second depiction 511 at time t=t2; and, the second depiction 511 at time t=t2 precedes the third depiction 512 at time t=t3. As observed in FIG. 5*b*, the optical permissiveness changes as the fusion region is heated by the scanning laser beam and stretched by the stretching force. In particular, note that peak wavelength spacing S between neighboring channels continually reduces as time increases. As such, a 2×1 WDM coupler having a specific neighboring channel spacing can be fabricated by "waiting" for the "looked-for" optical permissiveness pattern to appear (e.g., by waiting for a specific peak wavelength spacing S between neighboring optical channels). Note that for a specific optical spacing S between neighboring peak wavelengths observed at a particular time t, an approximately same spacing S is observed with respect to each neighboring channel pair.

Figure 6:
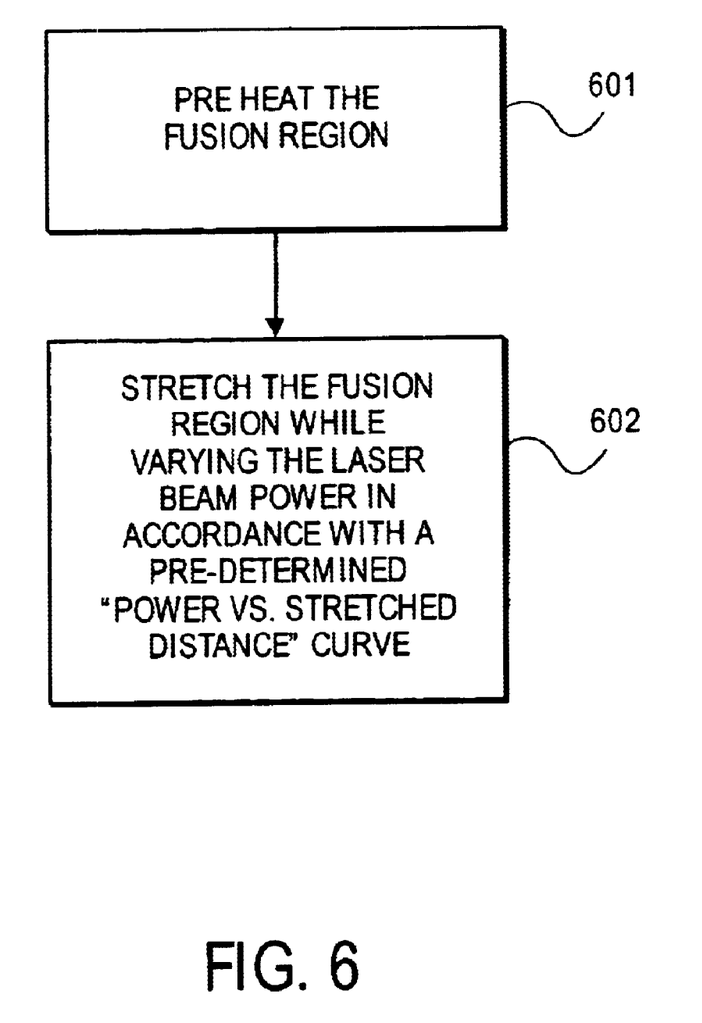
FIG. 6 elaborates on some procedures that may be used to implement the process of FIG. 4.
Figure 7:
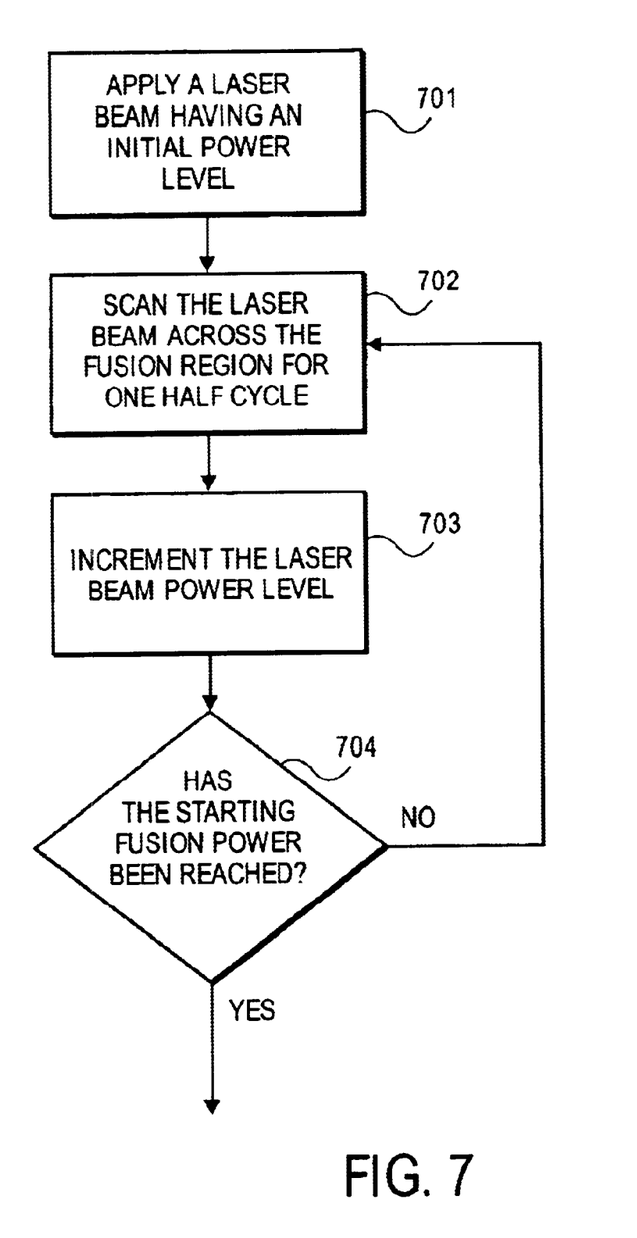
FIG. 7 shows an embodiment of a methodology that may be used to preheat a fusion region as referred to in FIG. 6.

FIG. 6 elaborates on some procedures that may be used to implement the process of FIG. 4. According to the procedures of FIG. 6, the fusion region is pre-heated 601 before the fusion region begins to stretched. Moreover, after the fusion region has been pre-heated 601; and, as part of the stretching and heating of the fusion region 401 of the process of FIG. 4, the power of the laser beam spot is varied 602 in accordance with a pre-determined "power vs. stretched distance" curve. FIG. 7 relates to an embodiment of the first procedure 601 while FIGS. 8*a* and 8*b* relate to an embodiment of the second procedure 602.

According to the approach of FIG. 7, a laser beam is configured to a have an "initial" power level 701. The, the laser beam is scanned 702 for one half cycle over the fusion region. That is, for example, starting at the middle of the fusion region, the laser beam spot is scanned over to the rightmost end of the fusion region and then back again so as to return to the middle of the fusion region. Here, a "starting" laser beam spot size power is also kept in mind where the "initial" power level is less than the "starting" power level. After the first half scan 702, the power level of the laser beam spot is incremented 703 and another half cycle scan of the beam is performed 702 so as to continue the motion of the scanning beam (e.g., if the first half cycle starts at the middle of the fusion region, scans to the rightmost end and returns to the middle; then, the second half cycle starts at the middle of the fusion region, scans to the leftmost end and returns to the middle . . . subsequent neighboring scans alternate direction in this fashion).

In one embodiment the "initial" power level is 1W, the "starting" power level is 2.5 W, and the increment amount is 0.125W. Thus, twelve half cycles are executed at twelve different power levels (1 W, 1.125 W, 1.25 W, 1.375 W, 1.5 W, 1.625 W, 1.75 W, 1.875 W, 2 W, 2.125 W, 2.25 W, 2.375W). When the power level of the beam is incremented to 2.5 W after execution of the twelfth (2.75 W power level) half cycle, the "starting" power level of 2.5W is reached and the pre-heating 601 of the fusion region is finished. Note that the various power levels help to craft a particular rate at which the temperature of the fusion region increases over time. Another parameter that helps determine the rate at which the fusion region temperature grows is the amount of time consumed scanning the laser beam spot across the fusion region for one full cycle. In a further embodiment of that just described above, the twelve different power levels are scanned at a rate of 2 seconds per half cycle scan (i.e., the scanning occurs at a frequency of 0.25 Hz per full cycle).

Figure 8A:
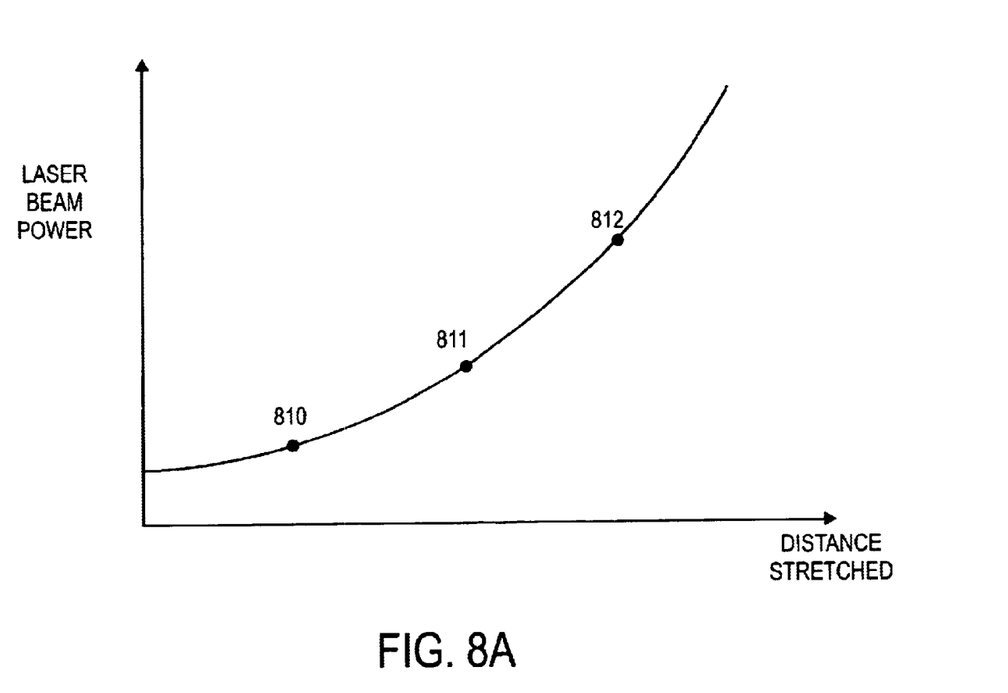
FIG. 8a shows a generic embodiment of a "Laser Beam Power" vs. "Distance Stretched" curve referred to in FIG. 6.
Figure 8B:
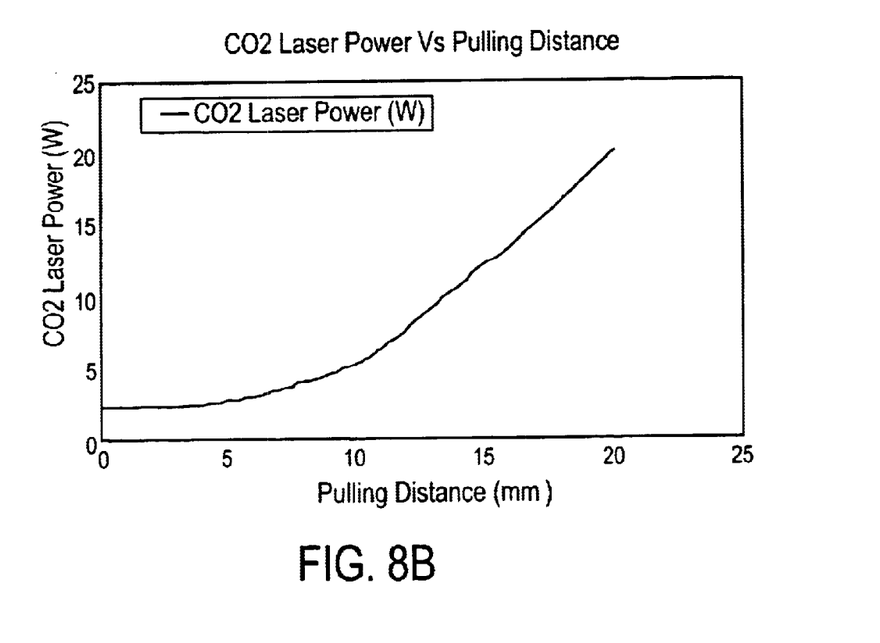
FIG. 8b shows a more specific embodiment of a "Laser Beam Power" vs. "Distance Stretched" curve referred to in FIG. 6.

FIGS. 8*a* and 8*b* relate to an embodiment of the second procedure 601 where the power of the laser beam spot is varied 602 in accordance with a pre-determined "power vs. stretched distance" curve. Thus, whereas the preheating process of FIG. 7 varies the laser beam power; similarly, the laser beam power is also varied during the actual stretching of the fusion region and the monitoring of the optical permissiveness of an optical path that flows through the fusion region. FIG. 8*a* shows a generic depiction of a power variation scheme. Note that the power is varied as a function of the distance that the fusion region is stretched in response to the stretching force that is applied to the fusion region.

Starting initially at the starting laser power and a stretching distance of 0 (i.e., at the origin of the curve of FIG. 8*a*), the laser power increases as the fusion region stretches in response to the applied stretching force and temperature. It is over the course of the curve that the optical permissiveness of an optical path that flows through the fusion region is monitored. For example, referring to both FIG. 8*a* and FIG. 5*b*, monitored observance 510 of FIG. 5*b* might correspond to point 810 on the curve of FIG. 8*a*; monitored observance 511 of FIG. 5*b* might correspond to point 811 on the curve of FIG. 8*a*; and monitored observance 512 of FIG. 5*b* might correspond to point 812 on the curve of FIG. 8*a*.

FIG. 8*b* shows a more detailed embodiment of a "power vs. stretched distance" curve. The curve of FIG. 8*b* may be used for Corning™ SMF-28 single mode type of optical fiber. Moreover, a pre-heating sequence should be used (e.g., as described above wherein twelve different power levels of 1 W, 1.125 W, 1.25 W, 1.375 W, 1.5 W, 1.625 W, 1.75 W, 1.875 W, 2 W, 2.125 W, 2.25 W, 2.375W are used that each consume 2 seconds per half cycle scan). The curve of FIG. 8*b* also applies to a laser beam spot size diameter of approximately 1 mm; and, a scanning frequency of 0.25 Hz (i.e., 4 seconds per full cycle scan). The full scanning length of the laser beam spot is approximately 6 mm. The laser beam spot is formed with a CO2 laser having a wavelength of approximately 10.6 μm. Related embodiments may exist where the spot size falls within a range between 0.8 mm to 1.2 mm inclusive; and/or, the scanning frequency falls within a range of 0.2 to 0.5 Hz per full cycle.

Figure 9A:
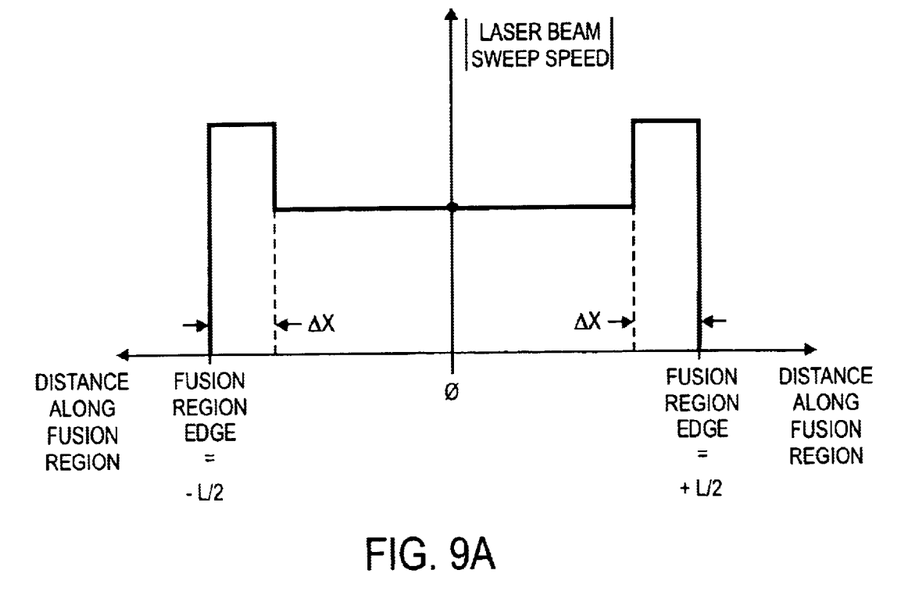
FIG. 9a shows a graphical depiction of a technique that varies the speed at which a laser beam spot is swept across a fusion region so that the ends of the fusion region do not overheat relative to the temperature of the central portions of the fusion region.
Figure 9B:
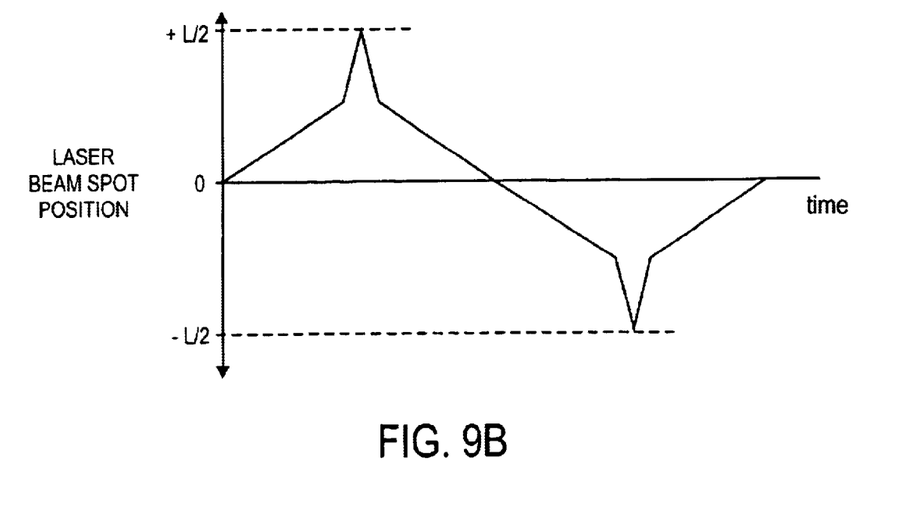
FIG. 9b shows another graphical depiction of a technique that varies the speed at which a laser beam spot is swept across a fusion region so that the ends of the fusion region do not overheat relative to the temperature of the central portions of the fusion region

FIGS. 9*a* and 9*b* show a graphical depiction of a technique that varies the speed at which a laser beam is swept across a fusion region so that the ends of the fusion region do not overheat relative to the temperature of the central portions of the fusion region. Better said, even though each full cycle scan may consume the same amount of time, the speed of a laser beam spot's sweeping speed is varied over the course of the fusion region so as to maintain an approximately even temperature throughout the fusion region. FIGS. 9a and 9b show that the speed is increased toward the ends of a complete sweep length L (i.e., near the +/−L/2 ends where the middle of the fusion region is understood to be the origin). That the spot speed should be increased toward the ends of the sweep makes sense when one carefully considers the pendulum like nature of the laser beam spot's movement and the localized effect on temperature growth.

That is, when the middle of the fusion region (near the origin of the horizontal axis of FIG. 9a and near the origin of the vertical axis of FIG. 9b) is scanned by the laser beam spot (causing its temperature to rise)—the same middle region must wait for the laser beam spot to extend all the way to the sweep end that it was heading towards (i.e., travel a distance of L/2) and then travel back across the same distance (i.e., travel another distance of L/2 from the end point back to the origin) before the laser beam spot returns to continue the heating process. During the travels of the laser beam spot across fusion region sections other than those near the midpoint—the midpoint is allowed to cool. Thus, in a sense, the middle portion of the fusion region receives a "blast of energy" from the passing laser beam spot (so as to increase its temperature), cools off, and then gets "blasted" with more energy as the laser beam spot passes by in the opposite direction.

By contrast, if the scanning speed of the laser beam spot were kept constant over the course of its sweeping distance, the ends of the fusion region would experience a different thermal growth profile characterized by a higher thermal spike during "visitation" by the laser beam spot and a longer cooling off period as compared to the middle portion of the fusion region. As a consequence, in order to keep the thermal growth of the entire fusion approximately uniform end-to-end, the higher thermal spikes at the end regions are effectively lowered by quickly passing the laser beam spot through them. In an embodiment that corresponds to the implementation of FIG. 8b and a 6 mm sweep distance Δx is approximately 0.6 mm.

Figure 10:
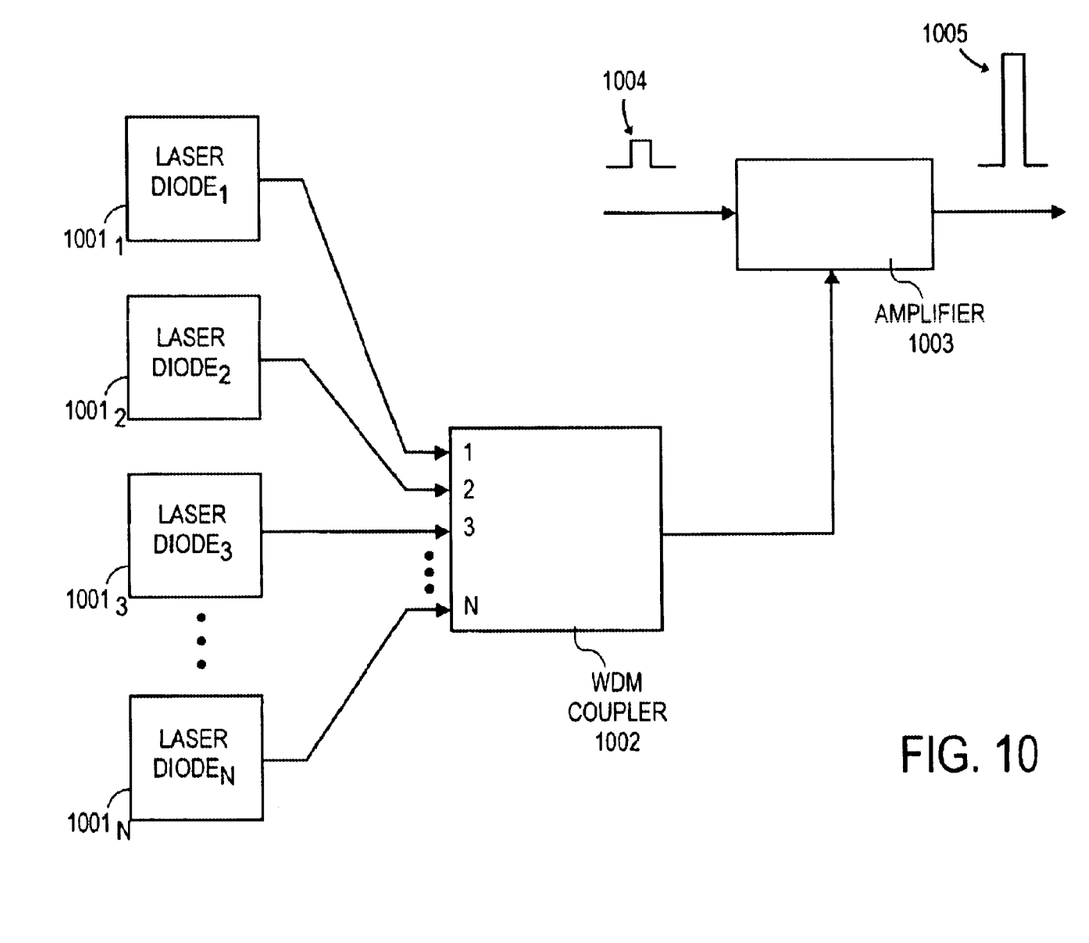
FIG. 10 shows an embodiment of an optical amplifier unit.

FIG. 10 shows an embodiment of an optical amplifier architecture that may make use of WDM coupler 1002 having a manufacturing process as taught above. The WDM coupler 1002 may be constructed with an appropriate arrangement of 2×1 WDM couplers so as to provide the appropriate multiplexing convergence. For example, FIG. 1 demonstrates an architecture for an 8×1 WDM coupler. Other architectures are also possible such as 2×1; 3×1, 4×1, etc. Each WDM coupler input receives light from a laser diode. As such, for an N×1 coupler 1002 (wherein N is an integer) there are N laser light sources $1001_1$–$1001_N$ (e.g., N laser diodes). The coupler 1002 multiplexes light from each the N laser light sources $1001_1$–$1001_N$ onto its output; which, in turn, is provided to either a Raman or Erbium Doped Fiber Amplifier (EDFA) optical amplifier 1003. The optical amplification performed by optical amplifier 1003 is suggested by the larger output optical pulse 1003 as compared to the smaller input optical pulse 1004.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   scanning a laser beam across and applying a stretching force to a fusion region formed by a neighboring pair of optical fibers that each include a core and a cladding layer while;
   monitoring optical permissiveness of an optical path that flows through said fusion region.

2. The method of claim 1 further comprising pre-heating said fusion prior to said scanning, stretching and monitoring.

3. The method of claim 2 wherein said pre-heating further comprises incrementing a spot of laser beam's power until a starting power is reached, wherein, for each increment in laser power during said pre-heating, a half cycle scan over said fusion region is performed.

4. The method of claim 1 further comprising in increasing said laser beam's power in accordance with a pre-defined relationship between said laser beam's power and a distance in which said fusion region is stretched.

5. The method of claim 4 further comprising pre-heating said fusion region prior to said scanning, stretching and monitoring.

6. The method of claim 5 wherein said pre-heating further comprises incrementing said laser beam's power until a starting power is reached, wherein, for each increment in laser power during said pre-heating, a half cycle scan over said fusion region is performed.

7. The method of claim 6 wherein each said increment is 0.125 W.

8. The method of claim 6 wherein each said half cycle scan consumes 2 seconds.

9. The method of claim 6 wherein said scanning, stretching and monitoring begins when a spot of said laser beam's power is incremented to 2.5 W.

10. The method of claim 1 wherein said scanning further comprises quickening the speed at which said laser beam travels across said fusion region near the ends of said laser beam's sweeping.

11. The method of claim 1 wherein said laser beam is formed with a $CO_2$ laser source.

12. The method of claim 1 wherein said method further comprises ceasing said scanning and stretching in response to said monitoring revealing that said optical permissiveness has a looked for characteristic.

13. The method of claim 12 wherein said characteristic is a specific neighboring channel peak wavelength spacing.

14. The method of claim 1 further comprising measuring said optical permissiveness at a wavelength, said wavelength within a range of 1370 nm to 1420 nm inclusive.

15. The method of claim 1 further comprising forming a 2×1 WDM coupler that includes said fusion region.

16. The method of claim 15 further comprising integrating said 2×1 WDM coupler into an arrangement of other 2×1 WDM couplers so as to form an N×1 WDM coupler module.

17. The method of claim 16 wherein N equals 3,4,5,6,7 or 8.

18. The method of claim 17 further comprising coupling the output of said N×1 WDM coupler module with an input of a Raman or EDFA optical amplifier.

19. An apparatus, comprising:
   a WDM coupler comprising a fusion region, said fusion region comprising a merged pair of neighboring optical fibers that each possessed a core and a cladding layer, said fused region having been formed by:

scanning a laser beam across and applying a stretching force to said neighboring pair of optical fibers; and, monitoring, during formation of said fusion region, optical permissiveness of an optical path that flowed through said fusion region.

20. The apparatus of claim 19 wherein said WDM coupler is a 2×1 WDM coupler.

21. The apparatus of claim 19 wherein WDM coupler is integrated into an N×1 WDM coupler module.

22. The apparatus of claim 21 wherein N equals 3,4,5,6,7 or 8.

23. The apparatus of claim 19 wherein said WDM coupler is situated to pass light that is directed to an input of Raman or EDFA optical amplifier.

24. The apparatus of claim 23 wherein said light includes a wavelength that is within a range of 1370 nm to 1420 nm inclusive.

25. The apparatus of claim 23 wherein said WDM coupler is configured to pass light having a wavelength within a range of 1370 nm to 1420 nm.

* * * * *